(12) United States Patent
Perets et al.

(10) Patent No.: US 8,843,123 B1
(45) Date of Patent: Sep. 23, 2014

(54) TECHNIQUES FOR ACCELERATING CELLULAR MEASUREMENTS

(71) Applicant: Marvell International Ltd., Hamilton (BM)

(72) Inventors: Yona Perets, Ra'anana (IL); Ezer Melzer, Tel Aviv (IL); Daniel Yellin, Ra'anana (IL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/670,469

(22) Filed: Nov. 7, 2012

Related U.S. Application Data

(60) Provisional application No. 61/558,394, filed on Nov. 10, 2011.

(51) Int. Cl.
*H04W 24/00* (2009.01)
(52) U.S. Cl.
USPC ........................................ 455/418; 455/277.1
(58) Field of Classification Search
USPC .............................................. 455/418, 277.1
See application file for complete search history.

(56) References Cited

U.S. PATENT DOCUMENTS

| | | | |
|---|---|---|---|
| 7,693,544 B2 * | 4/2010 | Segev et al. | 455/553.1 |
| 2007/0268876 A1 * | 11/2007 | Yellin et al. | 370/338 |
| 2008/0003969 A1 * | 1/2008 | Segev et al. | 455/277.1 |

* cited by examiner

*Primary Examiner* — Charles Shedrick

(57) ABSTRACT

Apparatus includes a receiver and a processor. The receiver includes at least first and second processing chains. The processor is configured to select a mode from a set of modes and to operate the receiver in accordance with the selected mode. The set of modes includes a first mode and at least one of a second mode and a third mode. In the first mode the first processing chain is configured to receive and demodulate serving cell signals from at least one serving cell that serves the apparatus, and the second processing chain is configured to receive and measure signals from the one or more neighbor cells. In the second mode the first and second processing chains are configured to receive and demodulate the serving cell signals. In the third mode the first and second processing chains are configured to receive and measure the signals from the neighbor cells.

20 Claims, 2 Drawing Sheets

TECHNIQUES FOR ACCELERATING CELLULAR MEASUREMENTS

CROSS-REFERENCE TO RELATED APPLICATIONS

This application claims the benefit of U.S. Provisional Patent Application 61/558,394, filed Nov. 10, 2011, whose disclosure is incorporated herein by reference.

FIELD OF THE DISCLOSURE

The present invention relates generally to wireless communication, and particularly to methods and systems for performing signal measurements in communication receivers.

BACKGROUND

In a cellular communication system, a mobile communication terminal may hand-off from one cell to another, for example when changing location or in response to varying capacity or propagation conditions. Modern cellular standards require mobile terminals to measure the reception quality of serving and neighbor cells in order to enable subsequent hand-off.

The description above is presented as a general overview of related art in this field and should not be construed as an admission that any of the information it contains constitutes prior art against the present patent application.

SUMMARY

An embodiment that is described herein provides an apparatus including a receiver and a processor. The receiver includes at least first and second processing chains. The processor is configured to select an operational mode for operating the receiver from a set of operational modes and to operate the receiver in accordance with the selected operational mode. The set of the operational modes includes a first mode and at least one of a second mode and a third mode. In the first mode the first processing chain is configured to receive and demodulate serving cell signals from at least one serving cell that serves the apparatus, and the second processing chain is configured to receive and measure signals from the one or more neighbor cells. In the second mode both the first and the second processing chains are configured to receive and demodulate the serving cell signals. In the third mode both the first and the second processing chains are configured to receive and measure the signals from the one or more neighbor cells.

In some embodiments, in the third mode, the first and the second processing chains are configured to receive and measure the signals from the one or more neighbor cells on a same frequency. In other embodiments, in the third mode, the first and the second processing chains are configured to receive and measure the signals from the one or more neighbor cells on respective different first and second frequencies.

In a disclosed embodiment, in the first mode, the first processing chain is configured to receive and demodulate the serving cell signals on a first frequency, and the second processing chain is configured to receive and measure the signals from the one or more neighbor cells on a second frequency that is different from the first frequency.

In another embodiment, in the second mode, at least the first processing chain is configured to receive and measure the signals from the one or more neighbor cells, in addition to and on a same frequency as receiving and demodulating the serving cell signals. In yet another embodiment, each of the first and second processing chains includes a respective main sub-chain and a respective diversity sub-chain for receiving input signals using different respective antennas. In still another embodiment, the first and second processing chains are configured to receive respective input signals from respective single first and second antennas.

In some embodiments, the receiver includes a front-end unit configured to down-convert and digitize input signals in a frequency band, and each of the first and second processing chains includes respective digital circuitry for individually processing the input signals down-converted and digitized by the front-end unit. In an embodiment, in selecting the operational mode, the processor is configured to give priority to demodulation of the serving cell signals over measurement of the signals from the one or more neighbor cells.

In another embodiment, the processor is configured to assess a minimal number of the processing chains that is needed for demodulation of the serving cell signals, and to select the operational mode so as to assign the minimal number of the processing chains for demodulating the serving cell signals, and a remaining number of the processing chains for measuring the signals from the one or more neighbor cells. In yet another embodiment, the processor is configured to select the third mode upon detecting that no serving cell signals addressed to the apparatus are to be received during a given time interval.

In still another embodiment, the processor is configured to estimate a reception quality of the serving cell signals, and to select the operational mode responsively to the estimated reception quality. In an example embodiment, the serving cell signals and the signals from the one or more neighbor cells comply with a communication protocol that requires the receiver to measure the signals from the one or more neighbor cells in designated time intervals, and the processor is configured to operate the receiver in the first or third mode so as to measure the signals from the one or more neighbor cells outside the designated time intervals.

In some embodiments, in the first mode, the processor is configured to reconfigure the second processing chain to receive and demodulate the serving cell signals, and to reconfigure the first processing chain to receive and measure the signals from the neighbor cells. In some embodiments, a mobile communication terminal includes the disclosed apparatus. In some embodiments, a chipset for processing signals in a mobile communication terminal includes the disclosed apparatus.

There is also provided, in accordance with an embodiment that is described herein, a method including receiving signals using a receiver that includes at least first and second reception processing chains. An operational mode is selected from a set of operational modes for operating the receiver, and the receiver is operated in accordance with the selected operational mode. The set of the operational modes includes a first mode and at least one of a second mode and a third mode. In the first mode the first processing chain receives and demodulates serving cell signals from at least one serving cell that serves the apparatus, and the second processing chain receives and measures signals from the one or more neighbor cells. In the second mode both the first and the second processing chains receive and demodulate the serving cell signals. In the third mode both the first and the second processing chains receive and measure the signals from the one or more neighbor cells.

The present disclosure will be more fully understood from the following detailed description of the embodiments thereof, taken together with the drawings in which:

DETAILED DESCRIPTION OF EMBODIMENTS

Figure 1:
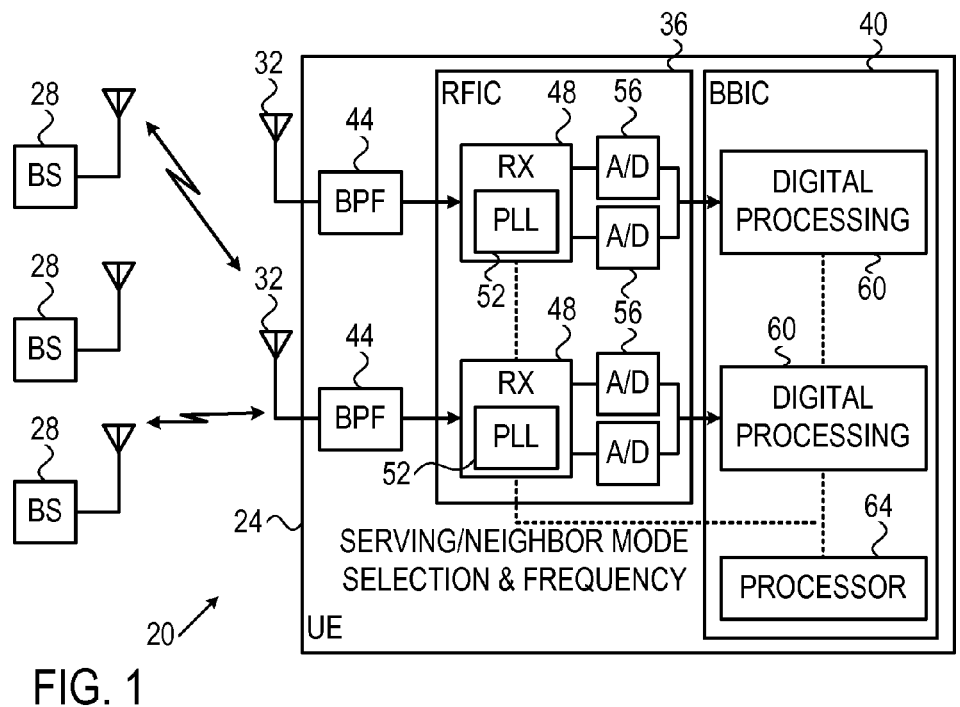
FIG. 1 is a block diagram that schematically illustrates a wireless communication system, in accordance with an embodiment that is described herein.

Embodiments that are described herein provide improved methods and systems for performing cell measurements by mobile communication terminals. In some embodiments, the receiver of a mobile communication terminal comprises multiple processing chains. Each processing chain is capable of either receiving and demodulating signals from a serving cell that currently serves the terminal, or receiving and measuring reception quality of a neighbor cell. The terminal comprises a processor, which configures the various processing chains so as to communicate with the serving cell and measure neighbor cells with high efficiency. Typically, each processing chain is independently configurable, under control of the processor, to tune to the channel of a serving or neighbor cell and perform signal reception, measurement and/or demodulation on that channel.

The description that follows refers to a receiver having two processing chains, but the disclosed techniques can be generalized to larger numbers of processing chains.

In some embodiments, the processor alternates among several operational modes: In a first mode, one processing chain receives and demodulates serving cell signals while the other processing chain measures neighbor cell signals. In a second mode, both processing chains receive and demodulate the serving cell signals. In a third mode, both processing chains receive and measure the neighbor cell signals. In various embodiments, the terminal supports various subsets of these modes, e.g., the first and second modes, the first and third modes, or all three modes.

In various embodiments, the processor alternates from one mode to another in accordance with different conditions or criteria. Typically, although not necessarily, the processor assesses the necessary resources for adequately receiving the serving cell signals, and directs the remaining resources to measurements of neighbor cells. In an example embodiment, when no active communication is held with the serving cell, the processor may assign both processing chains to measure neighbor cells, thereby reducing the measurement time. When the Signal to Noise Ratio (SNR) of the serving cell signals is poor, the processor assigns both processing chains to receive the serving cell signals in a diversity configuration, in order to maximize reception performance. When the serving cell SNR is high, the processor is able to receive the serving cell signals using only one processing chain, and free the other processing chain to measure neighbor cells.

Various examples of receiver and processing chain configurations, as well as criteria for alternating among operational modes, are described below. In some embodiments, the disclosed techniques are implemented in a terminal that comprises multiple processing chains for receiving Carrier Aggregation (CA) signals, namely, a terminal capable of receiving and demodulating signals that are transmitted simultaneously from several serving cells on possibly different carrier frequencies.

The disclosed techniques provide the terminal with a flexible and adaptive trade-off between robustness in receiving the serving cell signals, and the speed and accuracy of measuring the neighbor cell signals. As such, the disclosed techniques reduce battery power consumption and improve the mobility performance of mobile communication terminals, in an embodiment.

FIG. 1 is a block diagram that schematically illustrates a wireless communication system 20, in accordance with an embodiment that is described herein. In the present example, system 20 comprises a cellular system that operates in accordance with a cellular communication standard such as Global System for Mobile communications (GSM), Universal Mobile Telecommunications System (UMTS), Long-Term Evolution (LTE) or LTE-Advanced (LTE-A). In alternative embodiments system 20 may operate in accordance with any other suitable communication protocol.

System 20 comprises a mobile communication terminal 24 and multiple base stations 28. Terminal 24 is sometimes referred to as a User Equipment (UE) or Mobile Station (MS). Base stations 28 are sometimes referred to as cells, NodeB or eNodeB in accordance with the terminology used in different communications standards. Although the example of FIG. shows a single UE and three base stations for the sake of clarity, real-life systems typically comprise a large number of terminals and a large number of base stations. In some embodiments, UE 24 supports multiple Radio Access Technologies (RATs), i.e., it is able to communicate via networks of different RATs.

Typically, at a given time, UE 24 communicates with the cellular network via a particular base station 28. This base station is referred to as the serving cell of the UE. In addition, UE 24 is typically required to measure the reception quality of other base stations that are within range, referred to as neighboring cells. UE 24 performs these tasks efficiently using a receiver comprising multiple processing chains, as will be explained below.

In alternative embodiments, UE 24 communicates, either permanently or temporarily, with two or more cells simultaneously. In other words, at a given time, more than one cell may be defined as the serving cell of a given UE. Multiple serving cells are defined, for example, in Cooperative Multipoint (CoMP) systems. Although the embodiments described herein refer mainly to a single serving cell, the disclosed techniques are applicable to multiple serving cells, as well.

In the example of FIG. 1, UE 24 comprises a receiver comprising two processing chains. Each processing chain comprises a receive antenna 32, a Band Pass Filter (BPF) 44, reception (RX) circuitry 48 comprising a Phase-Locked Loop (PLL) 52, a pair of Analog-to-Digital (A/D) converters 56 and a digital processing unit 60. In alternative embodiments, UE 24 may comprise a larger number of processing chains, with more than one chain possibly sharing the same antenna.

Typically, in a given processing chain, receive antenna 32 receives Radio Frequency (RF) signals, BPF 44 filters-out undesired out-of-band signals, RX circuitry 48 down-converts a desired frequency channel to baseband, A/D converters 56 digitize the signal in the down-converted channel, and digital processing unit 60 processes the resulting digital signal. Depending on the currently-used operational mode, the unit 60 either demodulates a serving cell signal on the channel, or identifies a neighbor cell signal on the channel and measures the reception quality of the neighbor cell signal.

PLL 52 in each processing chain is used for tuning the processing chain to the desired channel to be demodulated or measured. In the present embodiment each processing chain comprises a separate PLL, thus enabling tuning each processing chain independently to different channel frequencies. In alternative embodiments, the processing chains may comprise any other suitable type of tuners or frequency sources other than PLLs.

Figure 2:
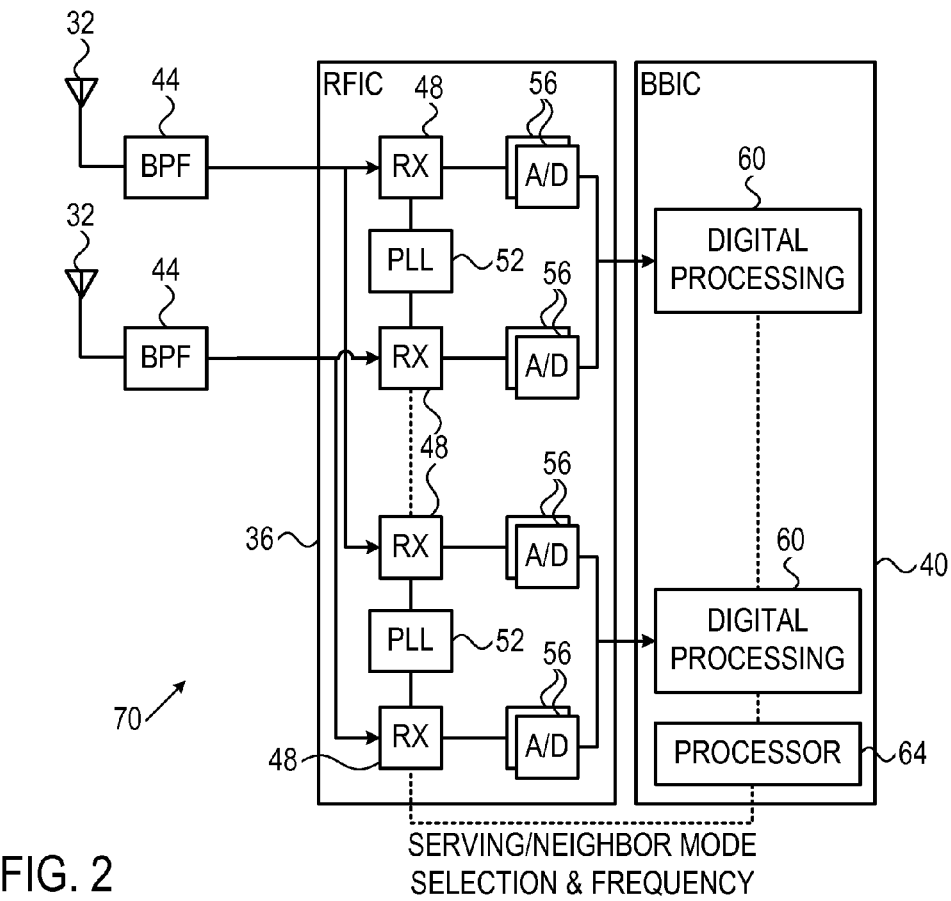
FIGS. 2 and 3 are block diagrams that schematically illustrate mobile communication terminals, in accordance with embodiments that is described herein.
Figure 3:
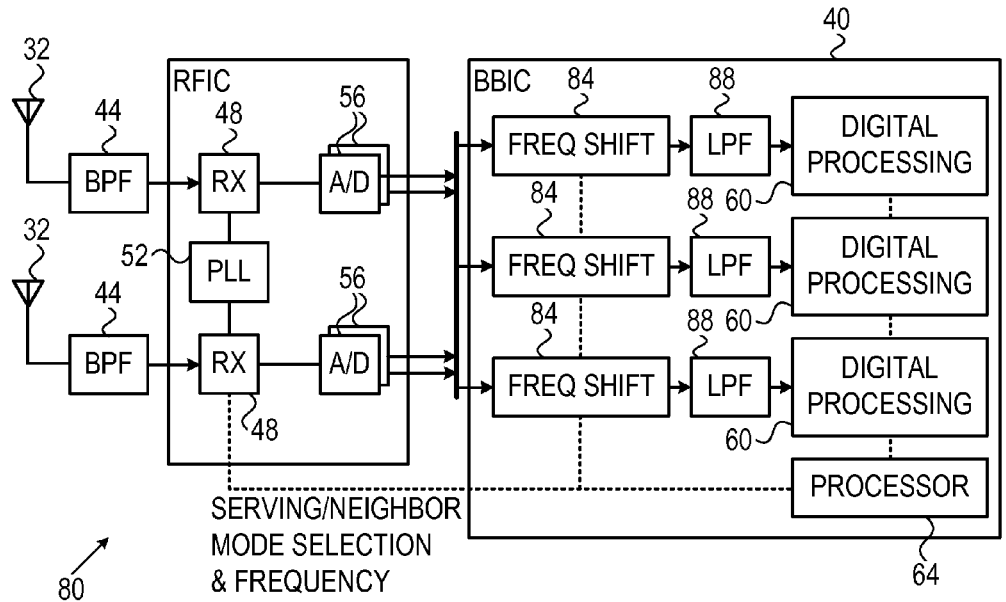

In the example embodiment of FIG. 1, the reception circuitry and A/D converters are implemented in a Radio Frequency Integrated Circuit (RFIC) 36, and the search and measurement modules are implemented in a Baseband Integrated Circuit (BBIC). A processor 64 manages the operation of UE 24. Among other tasks, processor 64 configures and controls the various elements of the processing chains. In alternative embodiments, any other suitable UE configuration can be used. Several additional examples of UE configurations are shown in FIGS. 2 and 3 below.

In some embodiments, UE 24 supports three operational modes: In the first mode, one processing chain receives and demodulates serving cell signals while the other processing chain measures neighbor cell signals. In the second mode, both processing chains receive and demodulate the serving cell signals, e.g., using diversity reception or spatial multiplexing. In the third mode, both processing chains receive and measure the neighbor cell signals.

Processor 64 selects and applies the desired operational mode, and alternates from one mode to another, based on certain criteria that are described below. In alternative embodiments, UE 24 supports a subset of these modes, e.g., the first and second modes, or the first and third modes. Processor 64 typically sets each processing chain to the desired mode, and also sets PLL 52 of each processing chain to the desired frequency channel.

The task of identifying and measuring a neighbor cell signal can be classified as intra-frequency, inter-frequency and inter-RAT. Since each processing chain in the present embodiment comprises its own independent PLL 52, processor 64 is capable of configuring the frequency of each processing chain independently of the other, so as to enable all three types of identification and measurement tasks (intra-frequency, inter-frequency and inter-RAT).

In an embodiment, in the first mode, processor 64 configures one processing chain to receive and demodulate the serving cell signal on one channel, and configures the other processing chain to identify and measure neighbor cell signals on another channel (either the same channel as the first processing chain for intra-frequency operation, or a different channel for inter-frequency or inter-RAT operation).

In an embodiment, in the second mode, processor 64 configures PLLs 52 of both processing chains to the same frequency of the serving cell, and configures units 60 of both processing chains to demodulate the serving cell signal. In this example, processor 64 configures both processing chains to demodulate the serving cell signal jointly from the signals received by both receive antennas 32, so as to exploit the diversity or spatial-multiplexing gain of using both antennas. In some embodiments, the two processing chains identify and measure intra-frequency neighbor cell signals in addition to (and on the same frequency as) the serving cell signals.

In an embodiment, in the third mode, processor 64 configures the two processing chains to identify and measure neighbor cell signals on different respective frequency channels. By assigning multiple processing chains to identify and measure neighbor cell signals in parallel, signals of multiple neighbor cells are received and measured simultaneously, and the search and measurement time is reduced considerably.

In this receiver configuration, diversity gain is not exploited when operating in the first and third modes, because the two processing chains receive different signals at a given time. Typically, however, system performance is not degraded considerably, because in these scenarios the UE typically searches for neighbor cells that are stronger than the serving cell.

In some embodiments, the third mode is divided into two sub-modes. In the first sub-mode, each processing chain identifies and measures neighbor cell signals on a different frequency, resulting in high measurement speed but without diversity gain. In the second sub-mode, both processing chains identify and measure neighbor cell signals on the same frequency using diversity reception. In this sub-mode, the receiver is able to identify weaker neighbor cells or operate under heavier interference. Measurement speed, on the other hand, is reduced in the second sub-mode because both processing chains operate on the same neighbor cell signal.

FIG. 2 is a block diagram that schematically illustrates a mobile communication terminal 70, in accordance with an alternative embodiment that is described herein. In the receiver of this embodiment, the outputs of both receive antennas 32 are provided to both processing chains, and each processing chain comprises a full diversity receiver. Each processing chain comprises two RX circuits 48 that are tuned to the same channel by a common PLL 52. The output of each RX circuitry 48 is digitized by a pair of A/D converters 56 and processed by a respective digital processing unit 60. In other words, in this embodiment each processing chain comprises a respective pair of main sub-chain and diversity sub-chain.

In the embodiment of FIG. 2, each processing chain is able to optimally combine the signals received via two receive antennas 32, and thus demodulate a serving cell signal or measure a neighbor cell signal with full diversity gain. Such a configuration is useful, for example, in a UE that supports Carrier Aggregation (CA). In CA operation in the second mode, different processing chains receive (on different frequencies) respective different component carriers that make-up the serving cells signal.

FIG. 3 is a block diagram that schematically illustrates a mobile communication terminal 80, in accordance with another embodiment that is described herein. In this embodiment, a single full-diversity receiver (comprising double RX circuitry 48, PLL 52 and A/D converters 56) serves as a common front-end for multiple processing chains. The analog circuitry in this example is typically broadband, e.g., on the order of 50 MHz or more. Thus, A/D converters 56 in this case produce a broadband digital signal that captures a wide frequency band. Each processing chain then extracts and processes the desired channel from this broadband digital signal.

In the present embodiment, each processing chain comprises a digital frequency shifting unit 84, a digital Low-Pass Filter (LPF) 88 and a digital processing unit 60. Processor 64 configures unit 84 in each processing chain to the desired frequency channel. In each processing chain, unit 84 tunes the desired frequency channel to baseband, LPF 88 filters out out-of-band signals so as to retain only the desired channel. Unit 60 in each processing chain processes the respective narrowband signal depending on the mode of operation.

As in the embodiments of FIGS. 1 and 2 above, each unit 60 is capable of either demodulating a serving cell signal, or identifying and measuring neighbor cell signals, in the extracted channel. Thus, in the scheme of FIG. 3 too, processor 64 may alternate between the above-described modes of operation.

Note that in various embodiments, the disclosed techniques can be carried out when the UE is in connected mode (i.e., engaged in active communication with the serving cell) or in idle mode. In connected mode, the communication protocol typically specifies specific time intervals (e.g., "measurement gaps" during continuous connected mode, or "sleep intervals" in Discontinuous-RX mode) in which the UE is allowed to identify and measure neighbor cell signals. Outside these time intervals the UE is expected to receive the serving cell signal.

In some embodiments, when operating in the first and/or third modes, processor 64 may instruct one or more processing chains to identify and measure neighbor cell signals outside of the designated time intervals. Since this processing chain operates independently of the processing chain that receives the serving cell signal, it does not have to operate only during the designated time intervals. As a result, a considerably longer time in the protocol is available for measuring neighbor cell signals, and the measurement time can be reduced considerably. This technique is applicable to any of the receiver configurations described herein.

The UE configurations shown in FIGS. 1-3 are example configurations, which are depicted in a highly simplified manner solely for the sake of clarity. In alternative embodiments, any other suitable UE configurations can be used. UE elements that are not mandatory for understanding of the disclosed techniques, for example uplink transmission circuitry, have been omitted from the figure for the sake of clarity.

In various embodiments, some or all of the elements of UEs 24, 70 and 80, are implemented in hardware, such as implementing RX circuitry 48, PLLs 52 and/or A/D converters 56 using one or more RFICs, or implementing units 60, units 84 and/or LPFs 88 using one or more Field-Programmable Gate Arrays (FPGAs) or Application-Specific Integrated Circuits (ASICs). In alternative embodiments, certain UE elements are implemented in software, or using a combination of hardware and software elements.

In some embodiments, certain UE elements, such as certain elements of processor 64, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

Figure 4:
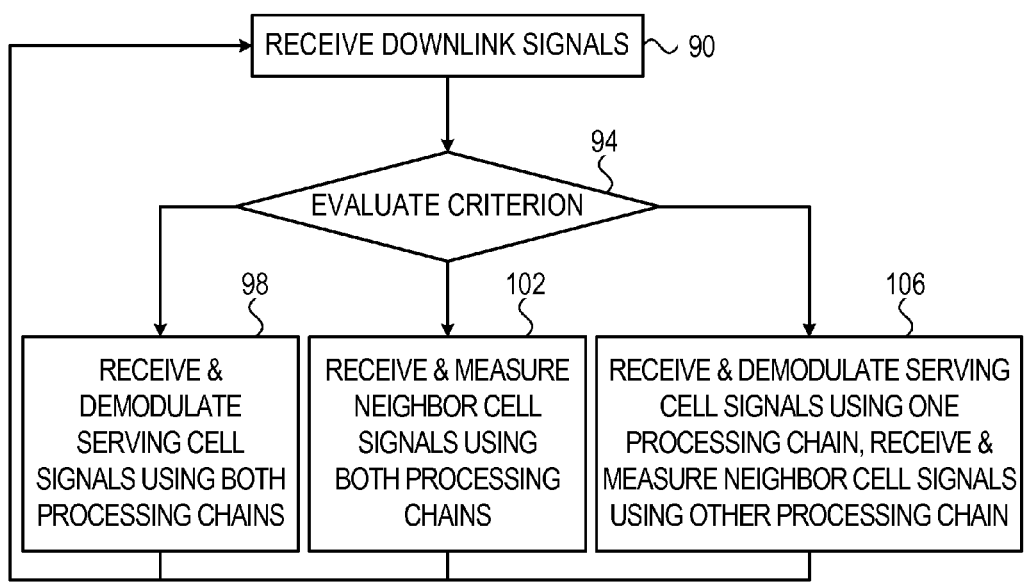
FIG. 4 is a flow chart that schematically illustrates a method for performing signal measurements, in accordance with an embodiment that is described herein.

FIG. 4 is a flow chart that schematically illustrates a method for performing signal measurements, in accordance with an embodiment that is described herein. The method begins with the UE receiver receiving downlink signals, at a reception operation 90. Processor 64 of the UE evaluates a mode selection criterion, at a criterion evaluation operation 94. Based on the criterion, processor 64 selects whether to configure the processing chains to operate in accordance with the first, second or third modes defined above. Several example criteria are described below.

If the criterion indicates that the UE is to operate in the first mode, processor 64 sets one processing chain to receive and demodulate the serving cell signals, and the other processing chain to receive and measure neighbor cell signals, at a first mode operation 106.

If the criterion indicates that the UE is to operate in the second mode, processor 64 sets both processing chains to receive and demodulate the serving cell signals, at a second mode operation 98. If the criterion indicates that the UE is to operate in the third mode, processor 64 sets both processing chains to receive and measure neighbor cell signals, at a third mode operation 102. The method then loops back to reception operation 90 above, and the UE continues to receive signals and possibly alternate from one mode to another.

In various embodiments, processor 64 evaluates different kinds of mode selection criteria. Typically, the second mode (both processing chains receive the serving cell signal) is selected if necessary due to the spatial-multiplexing order of the transmitted signal or due to operating under poor channel conditions, e.g., when the reception quality (e.g., SNR) of the serving cell signal is below some predefined threshold. When reception quality of the serving cell is above the threshold, and receive diversity is not mandatory, then at least one of the processing chains can be assigned to detecting neighbor cell signals.

Typically, processor 64 has information (e.g., based on signaling from the serving cell) as to the times and frequencies over which it is expected to receive data and control signals (and their transmission schemes) from the serving cell. The processor, however, has some flexibility in deciding how much of the UE processing resources (e.g., processing chains) it needs to assign to serving cell reception, and how much resources can be freed for neighbor cell measurement.

Typically, serving cell reception has priority over neighbor cell reception in an embodiment. In some embodiments, processor 64 estimates the minimal number of processing chains that are needed for adequate demodulation of the serving cell signal. (The minimal number may be zero, in case no data or control is scheduled for reception by the UE at a given point in time.) The processor selects the mode that assigns this minimal number of processing chains for serving cell reception, and assigns the remaining processing chains for neighbor cell measurement.

In an example embodiment, processor 64 selects the third mode (both processing chains receive neighbor cell signals) upon detecting that no data or control for the UE is scheduled for reception from the serving cell during a certain time interval. In such a scenario, processing resources can be directed to neighbor cell reception in order to reduce neighbor cell search and measurement time.

In another embodiment, when the UE is in idle mode and the reception quality of the neighbor cell signal is above some threshold (e.g., SNR>0 dB), processor 64 selects the first mode even during intervals in which it attempts to demodulate the serving cell signals. The threshold is typically set such that serving cell signals above the threshold can be demodulated successfully even without diversity gain.

In yet another embodiment, when the UE is in connected mode, there are scenarios in which the transmission mode of the serving cell (e.g., the Multiple-Input Multiple-Output—MIMO scheme and Modulation and Coding Scheme—MCS) is such that the diversity gain is either small (e.g., 0.5 dB or lower) or unnecessary for adequate demodulation. In this embodiment, processor 64 selects the first mode upon detecting such a scenario. In still another embodiment, this same criterion can be used for choosing between the two sub-modes of the third mode described above. In the latter embodiment, however, the criterion typically considers the accuracy requirements of neighbor cell measurements.

In alternative embodiments, processor 64 may select the appropriate mode of operation with which to configure the processing chains in accordance with any other suitable criterion.

Although the embodiments described herein mainly address cellular networks, the methods and systems described herein can also be used in other applications, such as in Cognitive Radio Systems.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
a receiver, which comprises at least first and second processing chains; and
a processor, which is configured to select an operational mode for operating the receiver from a set of operational modes and to operate the receiver in accordance with the selected operational mode, wherein the set of the operational modes comprises:
a first mode in which the first processing chain is configured to receive and demodulate serving cell signals from at least one serving cell that serves the apparatus, and the second processing chain is configured to receive and measure reception quality of signals from the one or more neighbor cells that do not serve the apparatus, while the first processing chain receives and demodulates the serving cell signals,
and at least one of:
a second mode in which both the first and the second processing chains are configured to simultaneously receive and demodulate the serving cell signals; and
a third mode in which both the first and the second processing chains are configured to simultaneously receive and measure the signals from the one or more neighbor cells.

2. The apparatus according to claim 1, wherein, in the third mode, the first and the second processing chains are configured to receive and measure the signals from the one or more neighbor cells on a same frequency.

3. The apparatus according to claim 1, wherein, in the third mode, the first and the second processing chains are configured to receive and measure the signals from the one or more neighbor cells on respective different first and second frequencies.

4. The apparatus according to claim 1, wherein, in the first mode, the first processing chain is configured to receive and demodulate the serving cell signals on a first frequency, and the second processing chain is configured to receive and measure the signals from the one or more neighbor cells on a second frequency that is different from the first frequency.

5. The apparatus according to claim 1, wherein, in the second mode, at least the first processing chain is configured to receive and measure the signals from the one or more neighbor cells, in addition to and on a same frequency as receiving and demodulating the serving cell signals.

6. The apparatus according to claim 1, wherein each of the first and second processing chains comprises a respective main sub-chain and a respective diversity sub-chain for receiving input signals using different respective antennas.

7. The apparatus according to claim 1, wherein the first and second processing chains are configured to receive respective input signals from respective single first and second antennas.

8. The apparatus according to claim 1, wherein the receiver comprises a front-end unit configured to down-convert and digitize input signals in a frequency band, and wherein each of the first and second processing chains comprises respective digital circuitry for individually processing the input signals down-converted and digitized by the front-end unit.

9. The apparatus according to claim 1, wherein, in selecting the operational mode, the processor is configured to give priority to demodulation of the serving cell signals over measurement of the signals from the one or more neighbor cells.

10. The apparatus according to claim 1, wherein the processor is configured to assess a minimal number of the processing chains that is needed for demodulation of the serving cell signals, and to select the operational mode so as to assign the minimal number of the processing chains for demodulating the serving cell signals, and a remaining number of the processing chains for measuring the signals from the one or more neighbor cells.

11. The apparatus according to claim 1, wherein the processor is configured to select the third mode upon detecting that no serving cell signals addressed to the apparatus are to be received during a given time interval.

12. The apparatus according to claim 1, wherein the processor is configured to estimate a reception quality of the serving cell signals, and to select the operational mode responsively to the estimated reception quality.

13. The apparatus according to claim 1, wherein the serving cell signals and the signals from the one or more neighbor cells comply with a communication protocol that requires the receiver to measure the signals from the one or more neighbor cells in designated time intervals, and wherein the processor is configured to operate the receiver in the first or third mode so as to measure the signals from the one or more neighbor cells outside the designated time intervals.

14. The apparatus according to claim 1, wherein, in the first mode, the processor is configured to reconfigure the second processing chain to receive and demodulate the serving cell signals, and to reconfigure the first processing chain to receive and measure the signals from the neighbor cells.

15. A mobile communication terminal comprising the apparatus of claim 1.

16. A chipset for processing signals in a mobile communication terminal, comprising the apparatus of claim 1.

17. A method, comprising:
receiving signals using a receiver that comprises at least first and second reception processing chains;
selecting an operational mode from a set of operational modes for operating the receiver, and operating the receiver in accordance with the selected operational mode, wherein the set of the operational modes comprises:
a first mode in which the first processing chain receives and demodulates serving cell signals from at least one serving cell that serves the receiver, and the second processing chain receives and measures reception quality of signals from one or more neighbor cells that do not serve the receiver, while the first processing chain receives and demodulates the serving cell signals,
and at least one of:
a second mode in which both the first and the second processing chains simultaneously receive and demodulate the serving cell signals; and
a third mode in which both the first and the second processing chains simultaneously receive and measure the signals from the one or more neighbor cells.

18. The method according to claim 17, wherein selecting the operational mode comprises giving priority to demodulation of the serving cell signals over measurement of the signals from the one or more neighbor cells.

19. The method according to claim 17, wherein selecting the operational mode comprises assessing a minimal number of the processing chains that is needed for demodulation of the serving cell signals, and selecting the operational mode so as to assign the minimal number of the processing chains for demodulating the serving cell signals, and a remaining number of the processing chains for measuring the signals from the one or more neighbor cells.

20. The method according to claim 17, wherein the serving cell signals and the signals from the one or more neighbor cells comply with a communication protocol that requires the receiver to measure the signals from the one or more neighbor cells in designated time intervals, and wherein operating the receiver comprises, in the first or third mode, measuring the signals from the one or more neighbor cells outside the designated time intervals.

* * * * *